United States Patent
Matsui (10) Patent No.: US 11,649,867 B2
(45) Date of Patent: May 16, 2023

(54) BRAKE PAD STATE ESTIMATION DEVICE AND BRAKE PAD STATE ESTIMATION METHOD

(71) Applicant: Toyota Jidosha Kabushiki Kaisha, Toyota (JP)

(72) Inventor: Noriyoshi Matsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 17/335,335

(22) Filed: Jun. 1, 2021

(65) Prior Publication Data
US 2022/0018414 A1 Jan. 20, 2022

(30) Foreign Application Priority Data
Jul. 17, 2020 (JP) .............................. JP2020-122912

(51) Int. Cl.
*F16D 66/02* (2006.01)
*B60T 17/22* (2006.01)
*F16D 66/00* (2006.01)

(52) U.S. Cl.
CPC ............ *F16D 66/027* (2013.01); *B60T 17/22* (2013.01); *B60T 2210/36* (2013.01); *B60T 2250/04* (2013.01); *B60T 2270/88* (2013.01); *F16D 2066/001* (2013.01)

(58) Field of Classification Search
None
See application file for complete search history.

(56) References Cited

U.S. PATENT DOCUMENTS

| | | | |
|---|---|---|---|
| 6,260,665 B1 * | 7/2001 | Kramer | F16D 66/026 188/1.11 E |
| 2015/0192181 A1 * | 7/2015 | Asen | F16D 65/568 188/71.8 |

FOREIGN PATENT DOCUMENTS

| | | |
|---|---|---|
| JP | 2005-067508 A | 3/2005 |
| JP | 2015-041304 A | 3/2015 |
| JP | 6207075 B2 | 10/2017 |

* cited by examiner

*Primary Examiner* — Melanie Torres Williams
(74) *Attorney, Agent, or Firm* — Dinsmore & Shohl LLP (57) ABSTRACT

A brake pad state estimation device estimates a brake pad state including at least one of a wear volume and a temperature of a brake pad of a vehicle. The brake pad state estimation device acquires sensor detection information including a vehicle speed and a brake pressure, and calculates the brake pad state based on the sensor detection information during braking of the vehicle. The brake pad state estimation device variably sets a sampling period for acquiring the sensor detection information from a sensor according to a driving environment for the vehicle. The sampling period in a case where the wear volume or the temperature of the brake pad is expected to be lower is set to be longer than the sampling period in a case where the wear volume or the temperature of the brake pad is expected to be higher.

12 Claims, 9 Drawing Sheets

BRAKE PAD STATE ESTIMATION DEVICE AND BRAKE PAD STATE ESTIMATION METHOD

CROSS-REFERENCE TO RELATED APPLICATION

The present disclosure claims priority under 35 U.S.C. § 119 to Japanese Patent Application No. 2020-122912, filed Jul. 17, 2020, the contents of which application are incorporated herein by reference in their entirety.

BACKGROUND

Technical Field

The present disclosure relates to a technique of estimating a brake pad state including at least one of a wear volume and a temperature of a brake pad of a vehicle.

Background Art

Japanese Patent No. 6207075 discloses a wear volume computation device that calculates a wear volume of a braking member of a railroad car and the like. The wear volume computation device calculates (estimates) the wear volume of the braking member based on a brake pressure, a speed of a braking target, and a braking time.

Japanese Laid-Open Patent Application Publication No. 2005-067508 discloses a wear alert system. The wear alert system estimates a wear volume of a brake pad by using an on-board sensor, and outputs a wear alarm according to a result of the estimation.

Japanese Laid-Open Patent Application Publication No. 2015-041304 discloses a method of calculating a wear volume based on a wear rate of a brake pad. The wear rate of the brake pad is a constant which depends on a temperature and a material of the brake pad, and is calculated from a characteristics table.

SUMMARY

During braking of a vehicle, a braking force is generated by pressing a brake pad against a brake rotor rotating with a wheel. At this time, the brake pad is worn by friction between the brake pad and the brake rotor. Estimating a wear volume of the brake pad is important for predicting decrease in a brake performance. The wear volume of the brake pad per unit input (i.e., per single braking) depends on a vehicle speed, a brake pressure, and the like. It is therefore possible to estimate (calculate) the wear volume based on the vehicle speed and the brake pressure.

Moreover, wear characteristics of the brake pad also depend on a temperature of a contact surface (friction part) that comes in contact with the brake rotor. The wear volume tends to be higher as the temperature of the contact surface becomes higher. Therefore, estimating the temperature of the contact surface of the brake pad also is important for predicting decrease in the brake performance. As in the case of the wear volume, the temperature of the contact surface depends on the vehicle speed, the brake pressure, and the like. It is therefore possible to estimate (calculate) the temperature of the contact surface based on the vehicle speed and brake pressure.

As described above, a "brake pad state" such as the wear volume and the temperature of the brake pad is calculated based on the vehicle speed and the brake pressure. The vehicle speed and the brake pressure are detected by sensors installed on the vehicle. In general, a sampling period of the sensor signal is very short and thus the amount of sensor detection information becomes enormous. Accordingly, the process of continuously calculating the brake pad state based on the sensor detection information is likely to consume considerable amounts of computational resource and storage resource.

An object of the present disclosure is to provide a technique that can suppress unnecessary consumption of a computational resource and a storage resource when estimating a brake pad state including at least one of a wear volume and a temperature of a brake pad of a vehicle.

A first aspect is directed to a brake pad state estimation device that estimates a brake pad state including at least one of a wear volume and a temperature of a brake pad of a vehicle.

The brake pad state estimation device includes:
a processor; and
a storage configured to store driving environment information indicating a driving environment for the vehicle.

The processor is programmed to execute:
an information acquisition process acquiring sensor detection information that includes a vehicle speed and a brake pressure detected by a sensor installed on the vehicle; and
a brake pad state calculation process calculating the brake pad state based on the sensor detection information during braking of the vehicle.

In the information acquisition process, the processor is further programmed to variably set a sampling period for acquiring the sensor detection information from the sensor according to the driving environment indicated by the driving environment information.

The sampling period in a case where the wear volume or the temperature of the brake pad is expected to be lower is set to be longer than the sampling period in a case where the wear volume or the temperature of the brake pad is expected to be higher.

Alternatively, the sampling period in a case where a likelihood of the braking of the vehicle being performed is lower is set to be longer than the sampling period in a case where a likelihood of the braking of the vehicle being performed is higher.

A second aspect is directed to a brake pad state estimation method that estimates a brake pad state including at least one of a wear volume and a temperature of a brake pad of a vehicle.

The brake pad state estimation method includes:
an information acquisition process acquiring sensor detection information that includes a vehicle speed and a brake pressure detected by a sensor installed on the vehicle; and
a brake pad state calculation process calculating the brake pad state based on the sensor detection information during braking of the vehicle.

Driving environment information indicates a driving environment for the vehicle.

The information acquisition process includes a process of variably setting a sampling period for acquiring the sensor detection information from the sensor according to the driving environment indicated by the driving environment information.

The sampling period in a case where the wear volume or the temperature of the brake pad is expected to be lower is set to be longer than the sampling period in a case where the wear volume or the temperature of the brake pad is expected to be higher.

Alternatively, the sampling period in a case where a likelihood of the braking of the vehicle being performed is lower is set to be longer than the sampling period in a case where a likelihood of the braking of the vehicle being performed is higher.

According to the present disclosure, the sampling period for acquiring the sensor detection information from the sensor is variably set according to the driving environment for the vehicle. For example, the sampling period in a case where the wear volume or the temperature of the brake pad is expected to be lower is set to be longer than the sampling period in a case where the wear volume or the temperature of the brake pad is expected to be higher. In another example, the sampling period in a case where a likelihood of the braking of the vehicle being performed is lower is set to be longer than the sampling period in a case where a likelihood of the braking of the vehicle being performed is higher.

That is, the sampling period is set to be long in a case where an impact on the brake performance is low, and the sampling period is set to be short in a case where the impact on the brake performance is high. It is thus possible to suppress the consumption of the computational resource and the storage resource in the case where the impact on the brake performance is low, and to calculate the brake pad state more precisely in the case where the impact on the brake performance is high. In other words, it is possible to efficiently secure an estimation accuracy of the brake pad state without consuming resources more than necessary.

EMBODIMENTS

Embodiments of the present disclosure will be described below with reference to the attached drawings.

1. Outline

1-1. Vehicle and Braking Device

Figure 1:
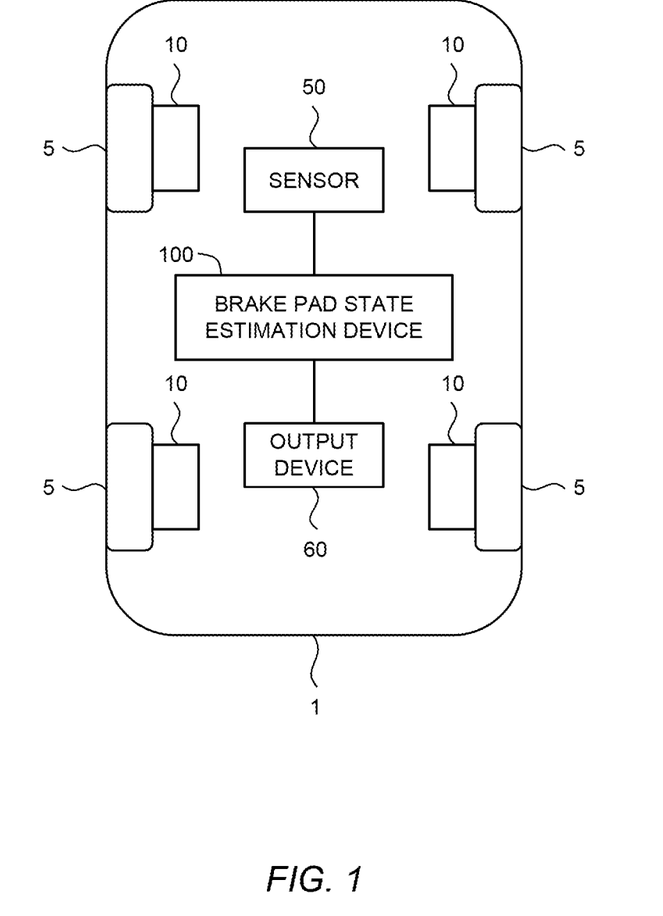
FIG. 1 is a schematic diagram showing a configuration of a vehicle according to an embodiment of the present disclosure.

FIG. 1 is a schematic diagram showing a configuration of a vehicle 1 according to the present embodiment. The vehicle 1 may be an automated driving vehicle controlled by an automated driving system. The vehicle 1 includes a wheel (tire) 5 and a braking device 10. The braking device 10 generates a braking force in response to a brake operation by a driver or the automated driving system.

Figure 2:
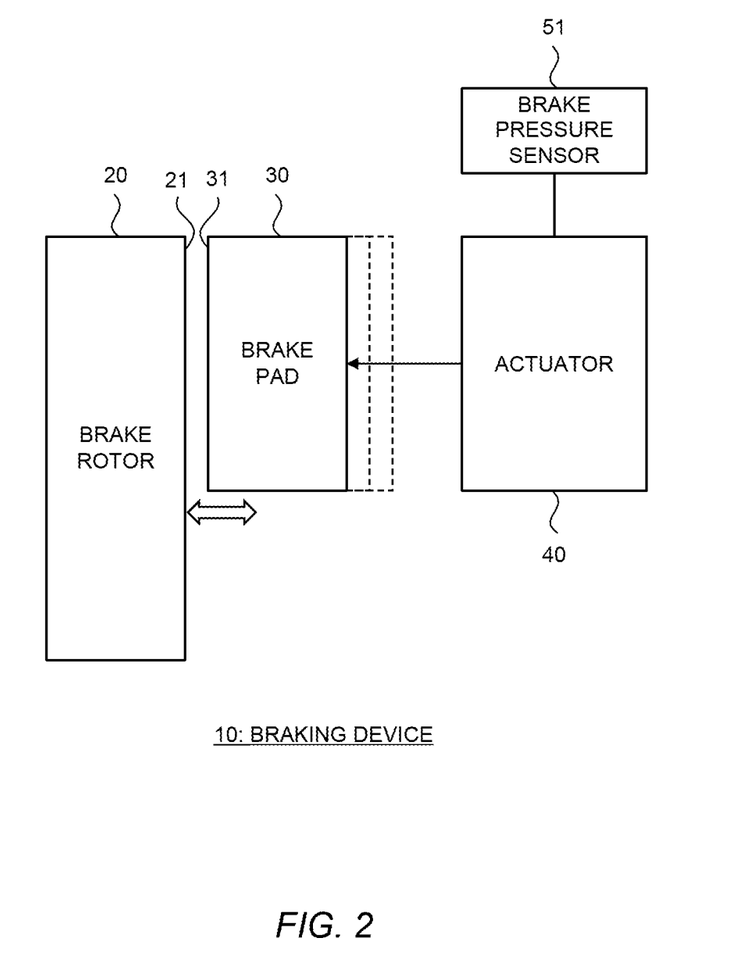
FIG. 2 is a block diagram schematically showing a configuration of a braking device according to an embodiment of the present disclosure.

FIG. 2 is a block diagram schematically showing a configuration of the braking device 10 according to the present embodiment. The braking device 10 includes a brake rotor 20, a brake pad 30, and an actuator 40.

The brake rotor 20 is a rotatable member that rotates with the wheel 5. For example, a material of the brake rotor 20 is cast iron. The brake pad 30 is a friction material that comes in contact with the brake rotor 20. For example, the brake pad 30 is formed by baking and solidifying a composite material including various organic fibers and inorganic fibers with a resin.

The actuator 40 moves and presses the brake pad 30 against the brake rotor 20 in response to the brake operation by the driver or the automated driving system. More specifically, the actuator 40 generates a brake pressure Pb in response to the brake operation and presses the brake pad 30 against the brake rotor 20 by the brake pressure Pb. For example, the actuator 40 includes a master cylinder and a caliper. In response to the brake operation, the master cylinder pushes brake fluid out to the caliper to generate the brake pressure (brake fluid pressure) Pb. The brake pressure Pb causes a piston in the caliper to push the brake pad 30 and push it against the brake rotor 20. As a result, the braking force is generated.

A brake pressure sensor 51 detects the brake pressure (brake fluid pressure) Pb.

During braking of the vehicle 1, the braking force is generated by pressing the brake pad 30 against the brake rotor 20 rotating with the wheel 5. At this time, a surface of the brake rotor 20 and a surface of the brake pad 30 come in contact with each other. The surface of the brake rotor 20 that comes in contact with the brake pad 30 is hereinafter referred to as a "contact surface 21." Similarly, the surface of the brake pad 30 that comes in contact with the brake rotor 20 is hereinafter referred to as a "contact surface 31." Due to friction between the contact surface 21 and the contact surface 31, the contact surface 31 of the brake pad 30 is worn. Estimating a wear volume of the brake pad 30 is important for predicting decrease in a brake performance.

1-2. Wear Volume Estimation

A wear volume W of the brake pad 30 per unit of input (i.e., per single braking) depends on a vehicle speed V, the brake pressure Pb, and a brake duration tb. The vehicle speed V is a rotational speed of the wheel 5 (i.e., a wheel speed). The brake duration tb is a duration in which the brake pressure Pb (i.e., the braking force) is generated. The wear volume W increases as the vehicle speed V becomes higher. The wear volume W increases as the brake pressure Pb becomes higher. The wear volume W increases as the brake duration tb becomes longer. That is, the wear volume W is expressed by the following Equation (1).

$$W = f(V, Pb, tb) \quad \text{Equation (1)}$$

A wear volume function f expresses the wear volume W as a function of the vehicle speed V, the brake pressure Pb, and the brake duration tb. The wear volume function f is a formula or a map designed in advance. The wear volume function f is designed so that the wear volume W increases as the vehicle speed V becomes higher. Similarly, the wear volume function f is designed so that the wear volume W increases as the brake pressure Pb becomes higher. In addition, the wear volume function f is designed so that the wear volume W increases as the brake duration tb becomes longer. Using the wear volume function f makes it possible to calculate (estimate) the wear volume W according to the vehicle speed V, the brake pressure Pb, and the brake duration tb.

1-3. Temperature Estimation

During the braking of the vehicle 1, frictional heat is generated due to the friction between the brake rotor 20 and the brake pad 30. Due to the frictional heat, a physical property of the material of the brake pad 30 irreversibly changes. For example, when the brake pad 30 includes a resin, the resin decomposes, melts, and vaporizes at a high temperature condition. As a result, the contact surface 31 of the brake pad 30 becomes brittle and easy to shave.

As described above, wear characteristics of the brake pad 30 also depend on a temperature Te of the contact surface 31 (i.e., the friction part). The wear volume W tends to be higher as the temperature Te of the contact surface 31 becomes higher. Therefore, estimating the temperature Te of the contact surface 31 also is important for predicting decrease in the brake performance.

The temperature Te of the contact surface 31 increases as the frictional heat between the brake rotor 20 and the brake pad 30 increases. Therefore, the temperature Te of the contact surface 31 becomes higher as the vehicle speed V becomes higher. The temperature Te of the contact surface 31 becomes higher as the brake pressure Pb becomes higher. The temperature Te of the contact surface 31 becomes higher as the brake duration tb becomes longer. That is, the temperature Te of the contact surface 31 is expressed by the following Equation (2).

$$Te = g(V, Pb, tb) \quad \text{Equation (2)}$$

A temperature function g expresses the temperature Te of the contact surface 31 as a function of the vehicle speed V, the brake pressure Pb, and the brake duration tb. The temperature function g is a formula or a map designed in advance. The temperature function g is designed so that the temperature Te increases as the vehicle speed V becomes higher. Similarly, the temperature function g is designed so that the temperature Te increases as the brake pressure Pb becomes higher. In addition, the temperature function g is designed so that the temperature Te increases as the brake duration tb becomes longer. Using the temperature function g makes it possible to calculate (estimate) the temperature Te of the contact surface 31 according to the vehicle speed V, the brake pressure Pb, and the brake duration tb.

1-4. Brake Pad State Estimation Device

A brake pad state estimation device 100 shown in FIG. 1 estimates (calculates) a "brake pad state ST" during the braking of the vehicle 1. Here, the "brake pad state ST" includes at least one of the wear volume W and the temperature Te of the brake pad 30 described above.

More specifically, the brake pad state estimation device 100 acquires sensor detection information that is detected by a sensor 50 installed on the vehicle 1. The sensor 50 includes the brake pressure sensor 51 that detects the brake pressure Pb and a wheel speed sensor that detects the vehicle speed V. The sensor detection information includes the vehicle speed V and the brake pressure Pb detected by the sensor 50. The brake duration tb can be acquired from a time during which the brake pressure Pb is generated.

The brake pad state estimation device 100 calculates the brake pad state ST based on the sensor detection information. More specifically, the brake pad state estimation device 100 calculates the brake pad state ST according to the vehicle speed V, the brake pressure Pb, and the brake duration tb by using the wear volume function f and/or the temperature function g.

The brake pad state estimation device 100 calculates the brake pad state ST for each brake operation. Then, the brake pad state estimation device 100 accumulates the result of calculation of the brake pad state ST in a storage device. For example, the brake pad state estimation device 100 continuously calculates the wear volume W of the brake pad 30, and accumulates information of the wear volume W and a cumulative wear volume Wt in the storage device. If the cumulative wear volume Wt exceeds a threshold, the brake pad state estimation device 100 may output an alert through an output device 60 (e.g., a display, a speaker).

Typically, the brake pad state estimation device 100 is installed on the vehicle 1. Alternatively, the brake pad state estimation device 100 may be placed outside the vehicle 1 and remotely estimate the brake pad state ST. In this case, the brake pad state estimation device 100 communicates with the vehicle 1 to acquire the sensor detection information detected by the sensor 50 installed on the vehicle 1.

When the brake pad state estimation device 100 is installed on the vehicle 1, the brake pad state estimation device 100 may transmit information on the result of calculation of the brake pad state ST to an external device (e.g., a management server) outside the vehicle 1. In this case, the output device 60 installed on the vehicle 1 includes a communication device, and the information of the brake pad state ST is transmitted through the communication device.

1-5. Sampling Period Control

In general, a sampling period of the sensor signal is very short and thus the amount of sensor detection information becomes enormous. Accordingly, a "brake pad state calculation process" that continuously calculates the brake pad state ST based on the sensor detection information is likely to consume considerable amounts of computational resource and storage resource.

In view of the above, according to the present embodiment, "sampling period control" is executed in order to suppress unnecessary consumption of the computational resource and the storage resource. In the sampling period control, the brake pad state estimation device 100 variably sets a sampling period (sampling interval) Ts for acquiring the sensor detection information from the sensor 50 depending on a situation.

For example, the sampling period control is performed from a viewpoint of the wear volume W or the temperature Te of the brake pad 30 that is expected when the braking (i.e., the brake operation) of the vehicle 1 is assumed to be performed. More specifically, the sampling period Ts is set to be relatively long in a situation where the wear volume W is expected to be relatively low or the temperature Te is expected to be relatively low. Conversely, the sampling period Ts is set to be relatively short in a situation where the wear volume W is expected to be relatively high or the temperature Te is expected to be relatively high. That is to say, the sampling period Ts is set to be long in a case where an impact on the brake performance is low, and the sampling period Ts is set to be short in a case where the impact on the brake performance is high. It is thus possible to suppress the consumption of the computational resource and the storage resource in the case where the impact on the brake performance is low, and to calculate the brake pad state ST more precisely in the case where the impact on the brake performance is high. In other words, it is possible to efficiently secure an estimation accuracy of the brake pad state ST without consuming resources more than necessary.

Figure 3:
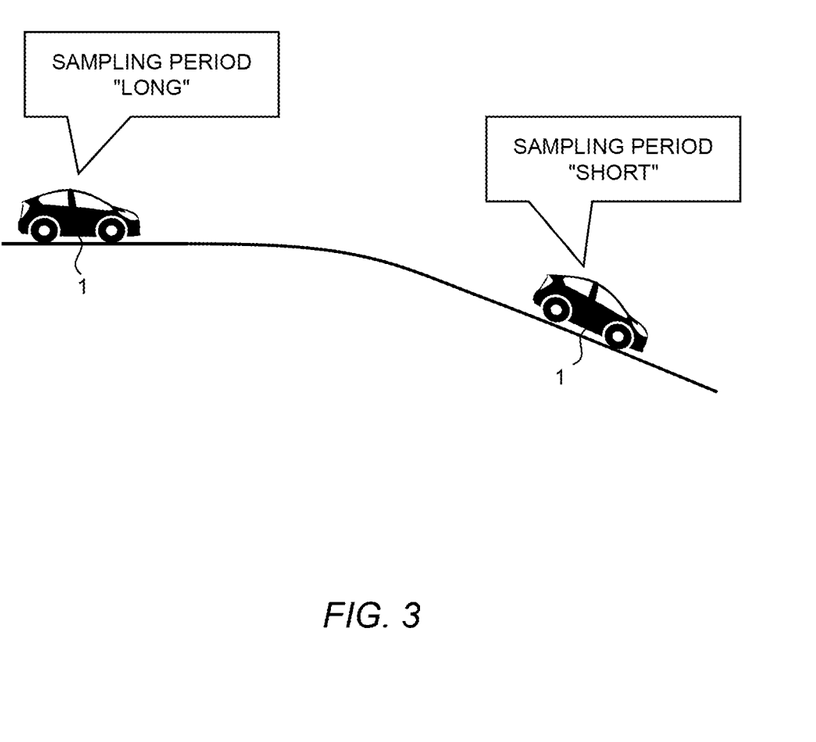
FIG. 3 is a conceptual diagram showing an example of variable setting of a sampling period according to an embodiment of the present disclosure.

FIG. 3 is a conceptual diagram showing an example of the variable setting of the sampling period Ts. In a case where the vehicle 1 is traveling on a downhill road, it is expected that the brake pressure Pb becomes high and the brake duration tb becomes long if the braking is performed. That is, it is expected that the wear volume W of the brake pad 30 is expected to be relatively high or the temperature Te is expected to be relatively high. Therefore, in the case where the vehicle 1 is traveling on the downhill road, the sampling period Ts is set to be relatively short. On the other hand, in a case where the vehicle 1 is not traveling on the downhill road, the sampling period Ts is set to be relatively long.

Conversely, in a case where the vehicle 1 is traveling on an uphill road, it is expected that the brake pressure Pb becomes low and the brake duration tb becomes short if the braking is performed. That is, it is expected that the wear volume W of the brake pad 30 is expected to be relatively low or the temperature Te is expected to be relatively low. Therefore, in the case where the vehicle 1 is traveling on the uphill road, the sampling period Ts is set to be relatively long. On the other hand, in a case where the vehicle 1 is not traveling on the uphill road, the sampling period Ts is set to be relatively short.

For example, when the vehicle 1 is traveling on a flat road, the sampling period Ts is set to a default value. When the vehicle 1 is traveling on a downhill road, the sampling period Ts is set to be shorter than the default value. On the other hand, when the vehicle 1 is traveling on an uphill road, the sampling period Ts is set to be longer than the default value.

As another example, the sampling period control may be performed from a viewpoint of a likelihood (possibility) of the braking (i.e., the brake operation) of the vehicle 1 being performed. More specifically, the sampling period Ts is set to be relatively long in a situation where the likelihood of the braking of the vehicle 1 being performed is low. On the other hand, the sampling period Ts is set to be relatively short in a situation where the likelihood of the braking of the vehicle 1 being performed is high. As a result, the same effects can be obtained.

Figure 4:
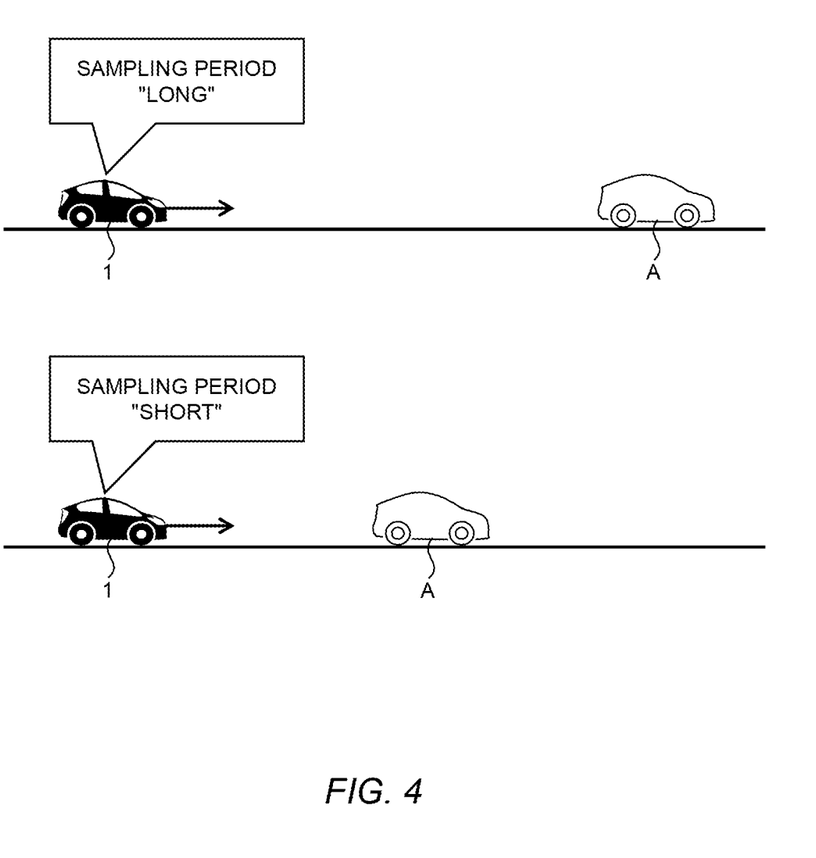
FIG. 4 is a conceptual diagram showing another example of variable setting of a sampling period according to an embodiment of the present disclosure.

FIG. 4 is a conceptual diagram showing another example of the variable setting of the sampling period Ts. In a case where an inter-vehicular distance or a TTC (Time to Collision) between the vehicle 1 and a preceding vehicle A is short, the likelihood of the braking of the vehicle 1 being performed is high. Therefore, the sampling period Ts is set to be relatively short in the case where the inter-vehicular distance or the TTC is short. Conversely, in a case where the inter-vehicular distance or the TTC is long, the likelihood of the braking of the vehicle 1 being performed is low, and thus the sampling period Ts is set to be relatively long. For example, the sampling period Ts is set to be longer as the inter-vehicular distance or the TTC becomes longer.

To summarize the examples shown in FIGS. 3 and 4, it can be said that the road shape, the inter-vehicular distance, the TTC, and the like are a "driving environment" for the vehicle 1. That is, it can be said that the sampling period Ts is variably set according to the driving environment for the vehicle 1.

According to the present embodiment, as described above, the sampling period Ts for acquiring the sensor detection information from the sensor 50 is variably set according to the driving environment for the vehicle 1. For example, the sampling period Ts in a case where the wear volume W or the temperature Te of the brake pad 30 is expected to be lower is set to be longer than the sampling period Ts in a case where the wear volume W or the temperature Te of the brake pad 30 is expected to be higher. In another example, the sampling period Ts in a case where the likelihood of the braking of the vehicle 1 being performed is lower is set to be longer than the sampling period Ts in a case where the likelihood of the braking of the vehicle 1 being performed is higher.

That is, the sampling period Ts is set to be long in the case where the impact on the brake performance is low, and the sampling period Ts is set to be short in the case where the impact on the brake performance is high. It is thus possible to suppress the consumption of the computational resource and the storage resource in the case where the impact on the brake performance is low, and to calculate the brake pad state ST more precisely in the case where the impact on the brake performance is high. In other words, it is possible to efficiently secure the estimation accuracy of the brake pad state ST without consuming resources more than necessary.

Hereinafter, the brake pad state estimation device 100 according to the present embodiment will be described in more detail.

2. Brake Pad State Estimation Device

2-1. Configuration Example

Figure 5:
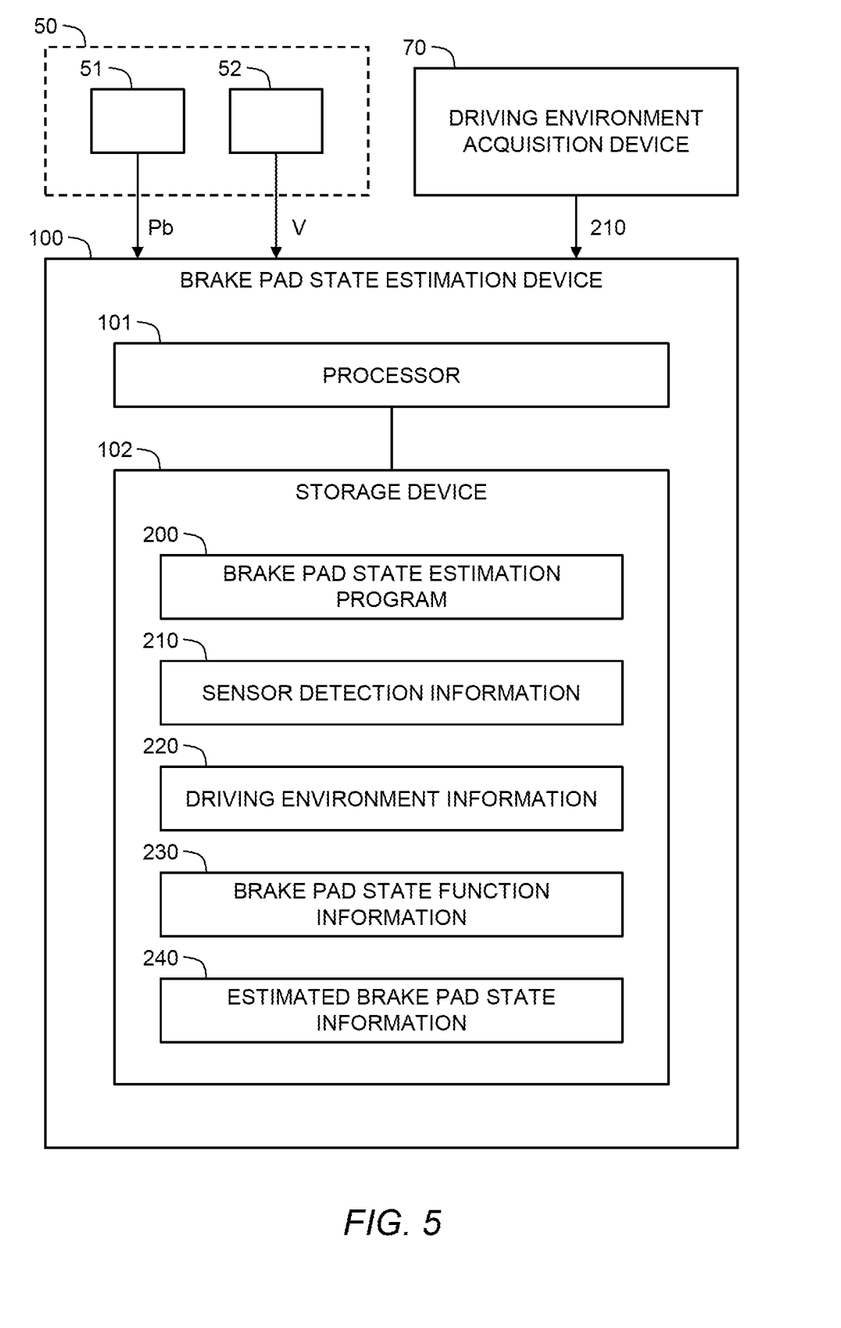
FIG. 5 is a block diagram showing a configuration example of a brake pad state estimation device according to an embodiment of the present disclosure.

FIG. 5 is a block diagram showing a configuration example of the brake pad state estimation device 100 according to the present embodiment. The brake pad state estimation device 100 is a computer that executes a variety of information processing. The brake pad state estimation device 100 includes a processor 101 and a storage device 102. The processor 101 executes a variety of information processing. For example, the processor 101 includes a CPU (Central Processing Unit). The storage device 102 stores a variety of information necessary for the processing by the processor 101. Examples of the storage device 102 include a volatile memory, a nonvolatile memory, an HDD (Hard Disk Drive), an SSD (Solid State Drive), and the like.

The brake pad state estimation device 100 may be included in an ECU (Electronic Control Unit) that controls the vehicle 1.

2-2. Brake Pad State Estimation Program

A brake pad state estimation program 200 is a computer program executed by a computer. The functions of the brake pad state estimation device 100 (the processor 101) is implemented by the processor 101 executing the brake pad state estimation program 200. The brake pad state estimation program 200 is stored in the storage device 102. The brake pad state estimation program 200 may be recorded on a computer-readable recording medium. The brake pad state estimation program 200 may be provided through a network.

2-3. Sensor Detection Information

Sensor detection information 210 is information detected by the sensor 50 installed on the vehicle 1. The sensor 50 includes the brake pressure sensor 51 and a wheel speed sensor 52. The brake pressure sensor 51 detects the brake pressure Pb. The wheel speed sensor 52 detects the vehicle speed V. The sensor detection information 210 includes the vehicle speed V, the brake pressure Pb, and the brake duration tb. The brake duration tb can be acquired from a time during which the brake pressure Pb is generated. The processor 101 acquires the sensor detection information 210 based on the result of detection by the sensor 50. The sensor detection information 210 is stored in the storage device 102.

2-4. Driving Environment Information

Driving environment information 220 is information indicating a driving environment for the vehicle 1. The driving environment information 220 is acquired by a driving environment acquisition device 70 installed on the vehicle 1. The acquired driving environment information 220 is stored in the storage device 102.

Figure 6:
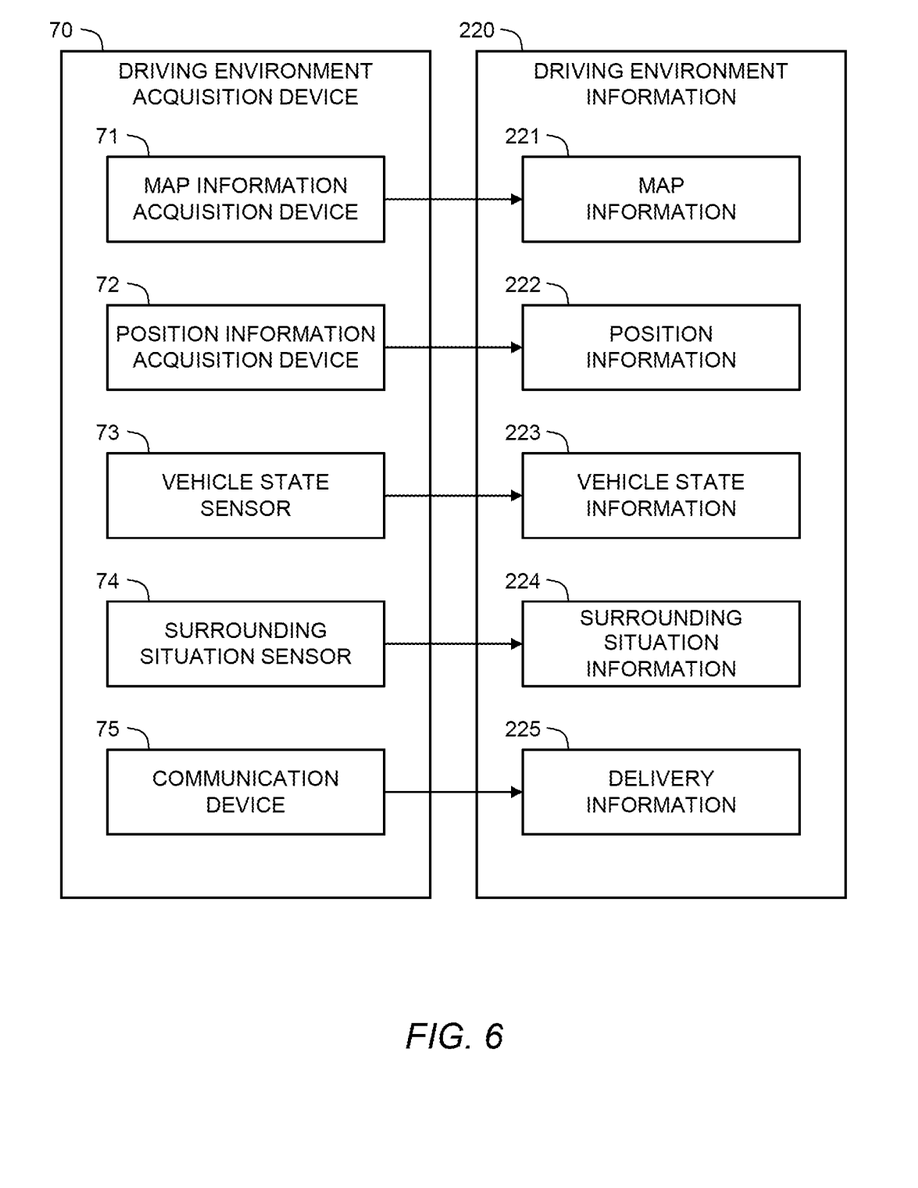
FIG. 6 is a block diagram showing an example of a driving environment acquisition device and driving environment information according to an embodiment of the present disclosure.

FIG. 6 is a block diagram showing an example of the driving environment acquisition device 70 and the driving environment information 220. The driving environment acquisition device 70 includes a map information acquisition device 71, a position information acquisition device 72, a vehicle state sensor 73, a surrounding situation sensor 74, and a communication device 75. The driving environment information 220 includes map information 221, position information 222, vehicle state information 223, surrounding situation information 224, and delivery information 225.

The map information acquisition device 71 acquires the map information 221. The map information 221 includes a commonly used navigation map. The map information 221 may include a three-dimensional map. The map information acquisition device 71 acquires the map information 221 of a necessary area from a map database. The map database may be stored in a predetermined storage device mounted on the vehicle 1, or may be stored in a management server outside the vehicle 1. In the latter case, the map information acquisition device 71 communicates with the management server to acquire the necessary map information 221.

The position information acquisition device 72 acquires the position information 222 indicating a position of the vehicle 1. For example, the position information acquisition device 72 includes a GPS (Global Positioning System) device.

The vehicle state sensor 73 acquires the vehicle state information 223 indicating a state of the vehicle 1. For example, the vehicle state sensor 73 includes a vehicle speed sensor, a yaw rate sensor, an acceleration sensor, a steering angle sensor, and the like. The vehicle speed sensor detects the vehicle speed V. The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle of the vehicle 1. It should be noted that the sensor 50 described above may be included in the vehicle state sensor 73.

The surrounding situation sensor 74 recognizes (detects) a situation around the vehicle 1. For example, the surrounding situation sensor 74 includes at least one of a camera, a LIDAR (Laser Imaging Detection and Ranging), and a radar. The surrounding situation information 224 indicates a result of recognition by the surrounding situation sensor 74. For example, the surrounding situation information 224 includes target information about a target recognized by the surrounding situation sensor 74. Examples of the target include a surrounding vehicle (e.g., the preceding vehicle A, a parked vehicle, and the like), a white line, an obstacle, a roadside structure, and the like. The target information includes information on a relative position and a relative speed of the target with respect to the vehicle 1.

The communication device 75 communicates with the outside of the vehicle 1. For example, the communication device 75 communicates with an external device outside the vehicle 1 via a communication network. The communication device 75 may perform a V2I communication (vehicle-to-infrastructure communication) and a V2V communication (vehicle-to-vehicle communication). The delivery information 225 is information acquired through the communication device 75. For example, the delivery information 225 includes traffic jam information, road traffic information, road work zone information, and the like.

2-5. Brake Pad State Function Information

Brake pad state function information 230 indicates the wear volume function f and/or the temperature function g. The brake pad state function information 230 is stored in advance in the storage device 102.

The wear volume function f expresses the wear volume W of the brake pad 30 as a function of the vehicle speed V, the brake pressure Pb, and the brake duration tb (see the above Equation (1)). The wear volume W increases as the vehicle speed V becomes higher. The wear volume W increases as the brake pressure Pb becomes higher. The wear volume W increases as the brake duration tb becomes longer. The wear volume function f may be a formula or may be a map. The wear volume function f is designed in advance based on actual measurements of the vehicle speed V, the brake pressure Pb, the brake duration tb, and the wear volume W.

The temperature function g expresses the temperature Te of the contact surface 31 as a function of the vehicle speed V, the brake pressure Pb, and the brake duration tb (see the above Equation (2)). The temperature Te increases as the vehicle speed V becomes higher. The temperature Te increases as the brake pressure Pb becomes higher. The temperature Te increases as the brake duration tb becomes longer. The temperature function g may be a formula or may be a map designed in advance. The temperature function g is designed in advance based on actual measurements of vehicle speed V, the brake pressure Pb, the brake duration tb, and the temperature Te.

2-6. Estimated Brake Pad State Information

Estimated brake pad state information 240 indicates the brake pad state ST that is estimated (calculated) by the brake pad state estimation device 100 (i.e., the processor 101). The brake pad state ST includes at least one of the wear volume W and the temperature Te of the brake pad 30. The estimated brake pad state information 240 may indicate the cumulative wear volume Wt which is an integrated value of the wear volume W. The estimated brake pad state information 240 is stored in the storage device 102.

3. Examples of Processing by Brake Pad State Estimation Device

Figure 7:
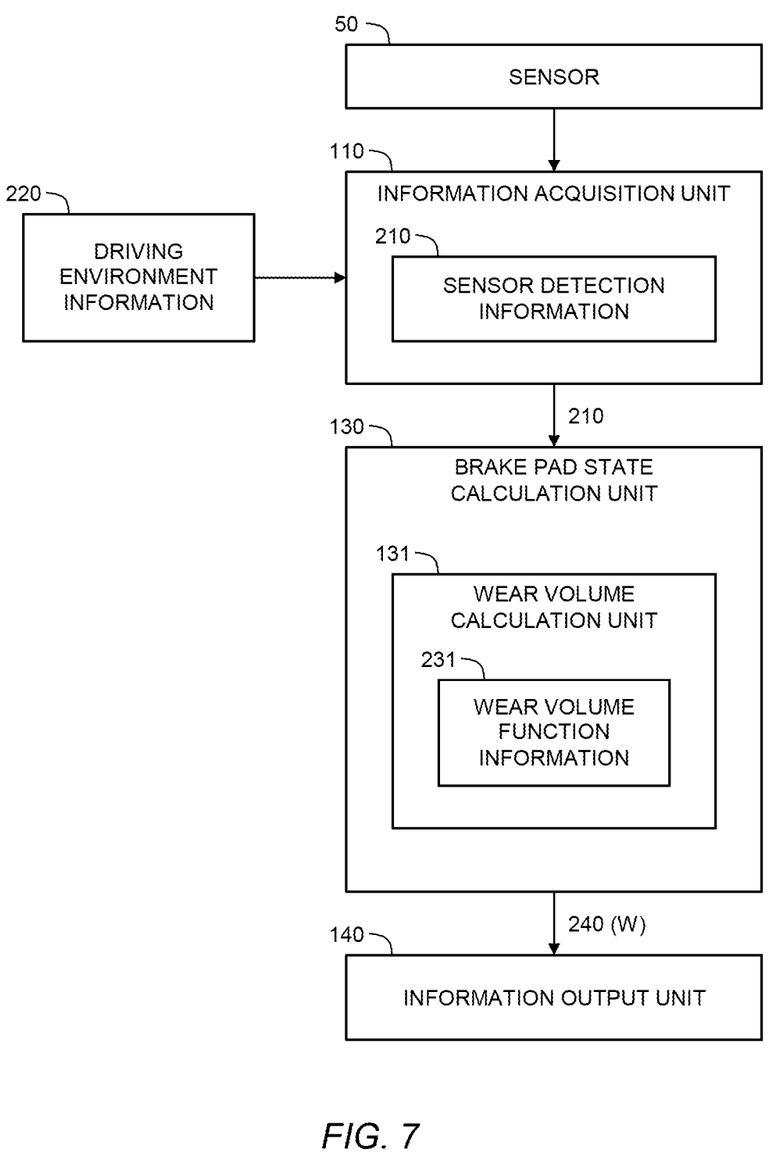
FIG. 7 is a functional block diagram for explaining an example of processing by the brake pad state estimation device according to an embodiment of the present disclosure.

FIG. 7 is a functional block diagram for explaining an example of processing by the brake pad state estimation device 100 according to the present embodiment. The brake pad state estimation device 100 includes an information acquisition unit 110, a brake pad state calculation unit 130, and an information output unit 140. These functional blocks are implemented by the processor 101 executing the brake pad state estimation program 200.

3-1. Information Acquisition Process

The information acquisition unit 110 acquires (samples) the sensor detection information 210 from the sensor 50. The sensor detection information 210 includes the vehicle speed V, the brake pressure Pb, and the brake duration tb. The sensor detection information 210 acquired (sampled) is stored in the storage device 102.

According to the present embodiment, the information acquisition unit 110 variably sets the sampling period (sampling interval) Ts for acquiring the sensor detection information 210 from the sensor 50 according to the driving environment indicated by the driving environment information 220. Hereinafter, various examples of the variable setting of the sampling period Ts will be described.

3-2. Sampling Period Control According to Driving Environment

3-2-1. First Example

The driving environment information 220 includes the map information 221 (3D map information) and the position information 222. The information acquisition unit 110 can determine whether or not the vehicle 1 is traveling on an uphill road based on the map information 221 and the position information 222. Here, the uphill road means a road whose slope is equal to or greater than a threshold value. As another example, it is also possible to detect a slope based on the vehicle state information 223 (specifically, the acceleration information) to determine whether or not the vehicle 1 is traveling on an uphill road.

In a case where the vehicle 1 is traveling on an uphill road, it is expected that the brake pressure Pb becomes low and the brake duration tb becomes short if the braking is performed. That is, it is expected that the wear volume W of the brake pad 30 is expected to be relatively low or the temperature Te is expected to be relatively low. Therefore, in the case where the vehicle 1 is traveling on the uphill road, the sampling period Ts is set to be relatively long. On the other hand, in a case where the vehicle 1 is not traveling on the uphill road, the sampling period Ts is set to be relatively short. That is, the information acquisition unit 110 sets the sampling period Ts in the case where the vehicle 1 is traveling on the uphill road to be longer than the sampling period Ts in the case where the vehicle 1 is not traveling on the uphill road.

Similarly, the information acquisition unit 110 determines whether or not the vehicle 1 is traveling on a downhill road based on the driving environment information 220. In a case where the vehicle 1 is traveling on a downhill road, it is expected that the wear volume W of the brake pad 30 is expected to be relatively high or the temperature Te is expected to be relatively high. Therefore, the information acquisition unit 110 sets the sampling period Ts in the case where the vehicle 1 is traveling on the downhill road to be shorter than the sampling period Ts in the case where the vehicle 1 is not traveling on the downhill road (see FIG. 3).

For example, when the vehicle 1 is traveling on a flat road, the information acquisition unit 110 sets the sampling period Ts to a default value. When the vehicle 1 is traveling on a downhill road, the information acquisition unit 110 sets the sampling period Ts to be shorter than the default value. On the other hand, when the vehicle 1 is traveling on an uphill road, the information acquisition unit 110 sets the sampling period Ts to be longer than the default value.

3-2-2. Second Example

The driving environment information 220 includes the vehicle state information 223 indicating of vehicle speed V. In a case where the vehicle speed V is high, the wear volume W of the brake pad 30 becomes relatively high or the temperature Te becomes relatively high. Therefore, the information acquisition unit 110 sets the sampling period Ts in a case where the vehicle speed V is higher to be shorter than the sampling period Ts in a case where the vehicle speed V is lower. In other words, the information acquisition unit 110 sets the sampling period Ts in the case where the vehicle speed V is lower to be longer than the sampling period Ts in the case where the vehicle speed V is higher.

For example, the information acquisition unit 110 decreases the sampling period Ts monotonically or in a stepwise manner as the vehicle speed V becomes higher.

3-2-3. Third Example

The driving environment information 220 includes the map information 221 and the position information 222. The information acquisition unit 110 can determine whether or not the vehicle 1 is traveling on an expressway based on the map information 221 and the position information 222.

In a case where the vehicle 1 is traveling on an expressway, it is considered that the likelihood of the braking (i.e., the brake operation) of the vehicle 1 being performed is relatively low. Therefore, in the case where the vehicle 1 is traveling on the expressway, the sampling period Ts is set to be relatively long. Conversely, in a case where the vehicle 1 is traveling on a local road (general road) other than the expressway, the likelihood of the braking being performed is relatively high, and thus the sampling period Ts is set to be relatively short. That is, the information acquisition unit 110 sets the sampling period Ts in the case where the vehicle 1 is traveling on the expressway to be longer than the sampling period Ts in the case where the vehicle 1 is traveling on the local road other than the expressway.

For example, when the vehicle 1 is traveling on a local road, the information acquisition unit 110 sets the sampling period Ts to a default value. When the vehicle 1 is traveling on an expressway, the information acquisition unit 110 sets the sampling period Ts to be longer than the default value.

3-2-4. Fourth Example

The driving environment information 220 includes the surrounding situation information 224. The surrounding situation information 224 indicates the inter-vehicular distance (i.e., the relative distance) and the relative speed between the vehicle 1 and the preceding vehicle A. It is also possible to calculate the TTC with respect to the preceding vehicle A from the inter-vehicular distance and the relative speed.

In a case where the inter-vehicular distance or the TTC is short, the likelihood of the braking (i.e., the brake operation) of the vehicle 1 being performed is high. Therefore, the sampling period Ts is set to be relatively short in the case where the inter-vehicular distance or the TTC is short. Conversely, in a case where the inter-vehicular distance or the TTC is long, the likelihood of the braking of the vehicle 1 being performed is low, and thus the sampling period Ts is set to be relatively long. That is, the information acquisition unit 110 sets the sampling period Ts in the case where the inter-vehicular distance or the TTC is longer to be longer than the sampling period Ts in the case where the inter-vehicular distance or the TTC is shorter (see FIG. 4).

For example, the information acquisition unit 110 increases the sampling period Ts monotonically or in a stepwise manner as the inter-vehicular distance or the TTC becomes longer.

3-2-5. Fifth Example

The driving environment information 220 includes the map information 221, the position information 222, and the delivery information 225. The delivery information 225 includes traffic jam information that indicates a position of a traffic jam. Based on the map information 221, the position information 222, and the traffic jam information, the information acquisition unit 110 can determine whether or not the vehicle 1 is within a predetermined area (i.e., a certain distance) on a near side of the traffic jam.

In a case where the vehicle 1 is within the predetermined area on the near side of the traffic jam, the likelihood of the braking (i.e., the brake operation) of the vehicle 1 being performed is high. Therefore, in the case where the vehicle 1 is within the predetermined area on the near side of the traffic jam, the sampling period Ts is set to be relatively short. On the other hand, in a case where the vehicle 1 is outside the predetermined area, the sampling period Ts is set to be relatively long. That is, the information acquisition unit 110 sets the sampling period Ts in the case where the vehicle 1 is within the predetermined area on the near side of the traffic jam to be shorter than the sampling period Ts in the case where the vehicle 1 is outside the predetermined area.

For example, when the vehicle 1 is outside the predetermined area, the information acquisition unit 110 sets the sampling period Ts to a default value. When the vehicle 1 enters the predetermined area, the information acquisition unit 110 sets the sampling period Ts to be shorter than the default value.

3-2-6. Sixth Example

It is also possible to combine some of the first to fifth examples described above.

3-3. Brake Pad State Calculation Process

During the braking of the vehicle 1, the brake pad state calculation unit 130 receives the sensor detection information 210 from the information acquisition unit 110. Then, the brake pad state calculation unit 130 calculates the brake pad state ST based on the sensor detection information 210 and the brake pad state function information 230.

In the example shown in FIG. 7, the brake pad state calculation unit 130 includes a wear volume calculation unit 131 that performs a wear volume calculation process. The brake pad state function information 230 includes wear volume function information 231 indicating the wear volume function f. The wear volume calculation unit 131 uses the wear volume function f to calculate the wear volume W according to the vehicle speed V, the brake pressure Pb, and the brake duration time tb. The wear volume calculation unit 131 may calculate the cumulative wear volume Wt by integrating the wear volume W calculated for each brake operation.

3-4. Information Output Process

The information output unit 140 receives the estimated brake pad state information 240 from the brake pad state calculation unit 130. In the example shown in FIG. 7, the estimated brake pad state information 240 includes the wear volume W calculated by the wear volume calculation unit 131. The estimated brake pad state information 240 may include the cumulative wear volume Wt. The information output unit 140 stores the estimated brake pad state information 240 in the storage device 102 and/or transmits the estimated brake pad state information 240 to an external device (e.g., a management server) outside the vehicle 1. If the cumulative wear volume Wt exceeds a threshold value, the information output unit 140 may output an alert through the output device 60 (e.g., a display, a speaker).

3-5. Modification Examples

Figure 8:
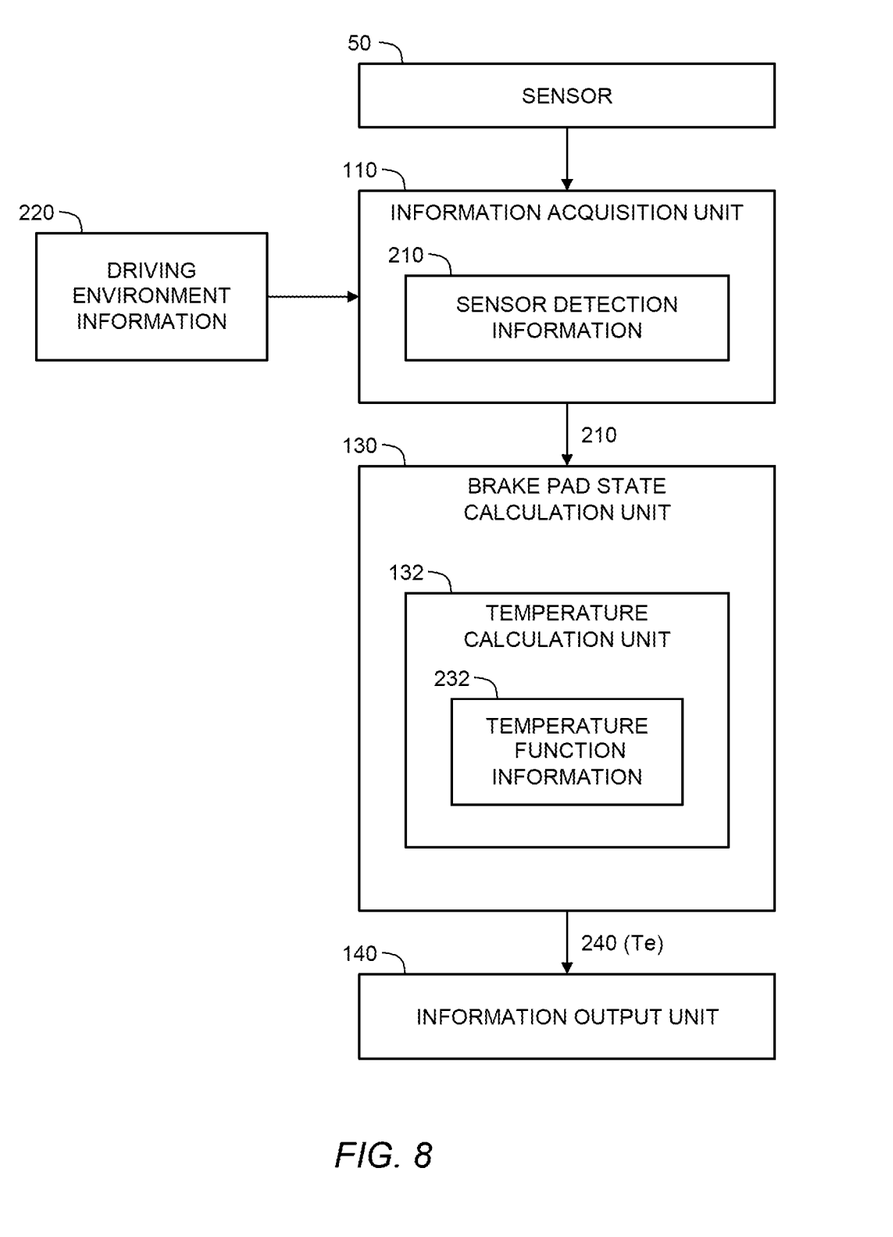
FIG. 8 is a functional block diagram for explaining a modification example of processing by the brake pad state estimation device according to an embodiment of the present disclosure.

FIG. 8 is a functional block diagram for explaining a modification example of the processing by the brake pad state estimation device 100 according to the present embodiment. In the example shown in FIG. 8, the brake pad state calculation unit 130 includes a temperature calculation unit 132 that performs a temperature calculation process. The brake pad state function information 230 includes temperature function information 232 indicating the temperature function g. The temperature calculation unit 132 uses the temperature function g to calculate the temperature Te of the contact surface 31 according to the vehicle speed V, the brake pressure Pb, and the brake duration tb. The estimated brake pad state information 240 includes the temperature Te calculated by the temperature calculation unit 132.

Figure 9:
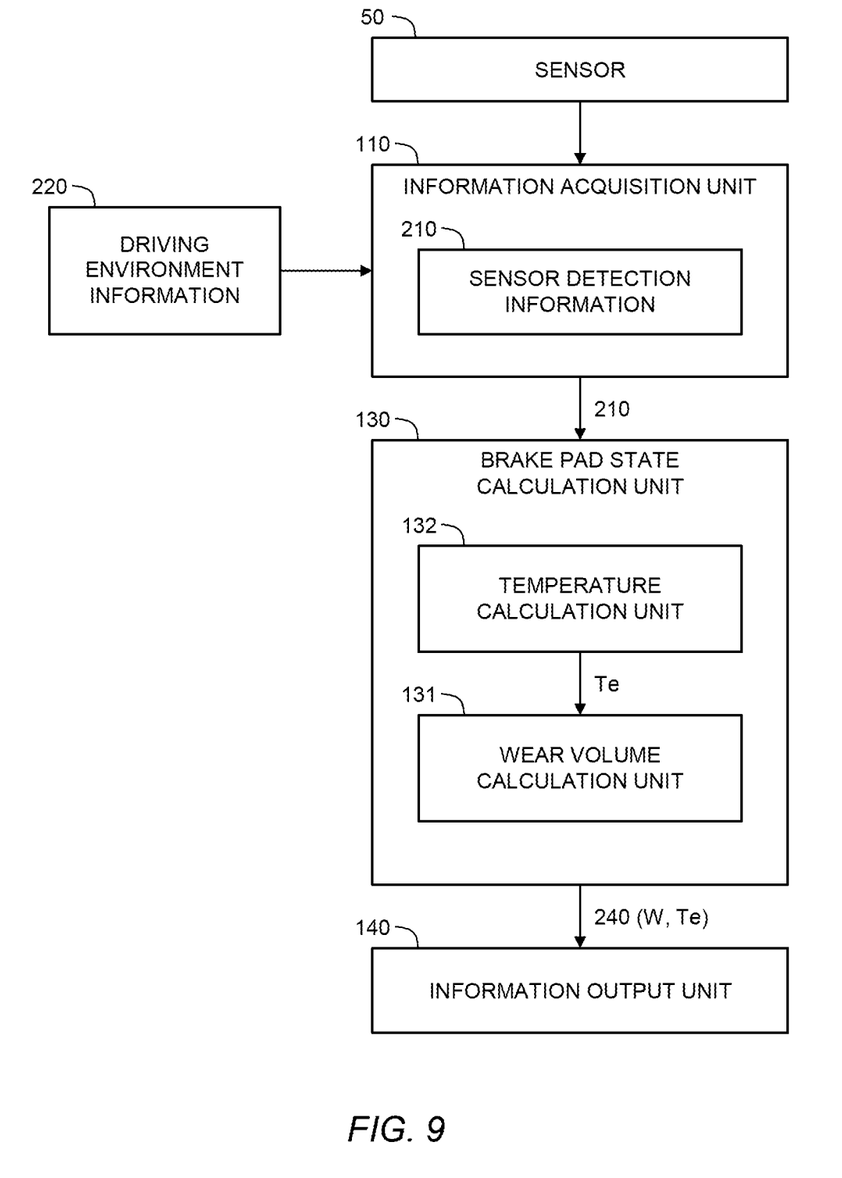
FIG. 9 is a functional block diagram for explaining another modification example of processing by the brake pad state estimation device according to an embodiment of the present disclosure.

FIG. 9 is a functional block diagram for explaining another modification example of the processing by the brake pad state estimation device 100 according to the present embodiment. In the example shown in FIG. 9, the brake pad state calculation unit 130 includes both the wear volume calculation unit 131 and the temperature calculation unit 132. The brake pad state function information 230 includes the wear volume function information 231 and the temperature function information 232. The temperature calculation unit 132 calculates the temperature Te of the contact surface 31 by using the temperature function g.

The wear volume calculation unit 131 calculates the wear volume W by taking the temperature Te into consideration as well. More specifically, the wear volume function f is designed so that the wear volume W increases as the temperature Te becomes higher. The wear volume calculation unit 131 uses the wear volume function f to calculate the wear volume W according to the vehicle speed V, the brake pressure Pb, the brake duration tb, and the temperature Te. The estimated brake pad state information 240 includes the wear volume W calculated by the wear volume calculation unit 131 and the temperature Te calculated by the temperature calculation unit 132.

4. Effects

According to the present embodiment, as described above, the sampling period Ts for acquiring the sensor detection information 210 from the sensor 50 is variably set according to the driving environment for the vehicle 1. For example, the sampling period Ts in a case where the wear volume W or the temperature Te of the brake pad 30 is expected to be lower is set to be longer than the sampling period Ts in a case where the wear volume W or the temperature Te of the brake pad 30 is expected to be higher. In another example, the sampling period Ts in a case where the likelihood of the braking of the vehicle 1 being performed is lower is set to be longer than the sampling period Ts in a case where the likelihood of the braking of the vehicle 1 being performed is higher.

That is, the sampling period Ts is set to be long in the case where the impact on the brake performance is low, and the sampling period Ts is set to be short in the case where the impact on the brake performance is high. It is thus possible to suppress the consumption of the computational resource and the storage resource in the case where the impact on the brake performance is low, and to calculate the brake pad state ST more precisely in the case where the impact on the brake performance is high. In other words, it is possible to efficiently secure the estimation accuracy of the brake pad state ST without consuming resources more than necessary.

Moreover, according to the present embodiment, it is possible to estimate the brake pad state ST by utilizing the existing sensor 50 (i.e., the brake pressure sensor 51 and the wheel speed sensor 52). This facilitates cost reduction.

Furthermore, according to the present embodiment, the brake pad state ST is automatically calculated. Thus, a failure of the brake pad 30 can be detected automatically regardless of the driver. The present embodiment may be applied to a case where no fixed driver exists (e.g., automated driving vehicle, car sharing).

What is claimed is:

1. A brake pad state estimation device that estimates a brake pad state including at least one of a wear volume and a temperature of a brake pad of a vehicle,
   the brake pad state estimation device comprising:
   a processor; and
   a storage configured to store driving environment information indicating a driving environment for the vehicle, wherein
   the processor is programmed to execute:
      an information acquisition process acquiring sensor detection information that includes a vehicle speed and a brake pressure detected by a sensor installed on the vehicle; and
      a brake pad state calculation process calculating the brake pad state based on the sensor detection information during braking of the vehicle,
   in the information acquisition process, the processor is further programmed to variably set a sampling period for acquiring the sensor detection information from the sensor according to the driving environment indicated by the driving environment information, and
   the sampling period in a case where the wear volume or the temperature of the brake pad is expected to be lower is set to be longer than the sampling period in a case where the wear volume or the temperature of the brake pad is expected to be higher, or
   the sampling period in a case where a likelihood of the braking of the vehicle being performed is lower is set to be longer than the sampling period in a case where a likelihood of the braking of the vehicle being performed is higher, wherein
   the processor is further programmed to:
      determine, based on the driving environment information, whether or not the vehicle is traveling on an uphill road; and
      set the sampling period in a case where the vehicle is traveling on the uphill road to be longer than the sampling period in a case where the vehicle is not traveling on the uphill road.

2. The brake pad state estimation device according to claim 1, wherein
   the processor is further programmed to:
      determine, based on the driving environment information, whether or not the vehicle is traveling on a downhill road; and
      set the sampling period in a case where the vehicle is traveling on the downhill road to be shorter than the sampling period in a case where the vehicle is not traveling on the downhill road.

3. The brake pad state estimation device according to claim 1, wherein
   the driving environment information includes map information and position information indicating a position of the vehicle,
   the processor is further programmed to:
      determine, based on the map information and the position information, whether or not the vehicle is traveling on an expressway; and
      set the sampling period in a case where the vehicle is traveling on the expressway to be longer than the sampling period in a case where the vehicle is traveling on a local road.

4. The brake pad state estimation device according to claim 1, wherein
   the driving environment information includes surrounding situation information indicating an inter-vehicular distance between the vehicle and a preceding vehicle, and
   the processor is further programmed to set the sampling period in a case where the inter-vehicular distance or a TTC (Time to Collision) is longer to be longer than the sampling period in a case where the inter-vehicular distance or the TTC is shorter.

5. The brake pad state estimation device according to claim 1, wherein
   the driving environment information includes map information, position information indicating a position of the vehicle, and traffic jam information indicating a position of a traffic jam,
   the processor is further programmed to:
      determine, based on the map information, the position information, and the traffic jam information, whether or not the vehicle is within a predetermined area on a near side the traffic jam, and
      set the sampling period in a case where the vehicle is within the predetermined area to be shorter than the sampling period in a case where the vehicle is outside the predetermined area.

6. A brake pad state estimation device that estimates a brake pad state including at least one of a wear volume and a temperature of a brake pad of a vehicle,
   the brake pad state estimation device comprising:
   a processor; and a storage configured to store driving environment information indicating a driving environment for the vehicle, wherein the processor is programmed to execute:

an information acquisition process acquiring sensor detection information that includes a vehicle speed and a brake pressure detected by a sensor installed on the vehicle; and a brake pad state calculation process calculating the brake pad state based on the sensor detection information during braking of the vehicle, in the information acquisition process, the processor is further programmed to variably set a sampling period for acquiring the sensor detection information from the sensor according to the driving environment indicated by the driving environment information, and the sampling period in a case where the wear volume or the temperature of the brake pad is expected to be lower is set to be longer than the sampling period in a case where the wear volume or the temperature of the brake pad is expected to be higher, or the sampling period in a case where a likelihood of the braking of the vehicle being performed is lower is set to be longer than the sampling period in a case where a likelihood of the braking of the vehicle being performed is higher, wherein the driving environment information includes map information and position information indicating a position of the vehicle, the processor is further programmed to:

determine, based on the map information and the position information, whether or not the vehicle is traveling on an expressway; and set the sampling period in a case where the vehicle is traveling on the expressway to be longer than the sampling period in a case where the vehicle is traveling on a local road.

7. The brake pad state estimation device according to claim 6, wherein the processor is further programmed to:

determine, based on the driving environment information, whether or not the vehicle is traveling on a downhill road; and set the sampling period in a case where the vehicle is traveling on the downhill road to be shorter than the sampling period in a case where the vehicle is not traveling on the downhill road.

8. The brake pad state estimation device according to claim 6, wherein the driving environment information includes surrounding situation information indicating an inter-vehicular distance between the vehicle and a preceding vehicle, and the processor is further programmed to set the sampling period in a case where the inter-vehicular distance or a TTC (Time to Collision) is longer to be longer than the sampling period in a case where the inter-vehicular distance or the TTC is shorter.

9. The brake pad state estimation device according to claim 6, wherein the driving environment information includes map information, position information indicating a position of the vehicle, and traffic jam information indicating a position of a traffic jam, the processor is further programmed to:

determine, based on the map information, the position information, and the traffic jam information, whether or not the vehicle is within a predetermined area on a near side the traffic jam, and set the sampling period in a case where the vehicle is within the predetermined area to be shorter than the sampling period in a case where the vehicle is outside the predetermined area.

10. A brake pad state estimation device that estimates a brake pad state including at least one of a wear volume and a temperature of a brake pad of a vehicle, the brake pad state estimation device comprising:

a processor; and a storage configured to store driving environment information indicating a driving environment for the vehicle, wherein the processor is programmed to execute:

an information acquisition process acquiring sensor detection information that includes a vehicle speed and a brake pressure detected by a sensor installed on the vehicle; and a brake pad state calculation process calculating the brake pad state based on the sensor detection information during braking of the vehicle, in the information acquisition process, the processor is further programmed to variably set a sampling period for acquiring the sensor detection information from the sensor according to the driving environment indicated by the driving environment information, and the sampling period in a case where the wear volume or the temperature of the brake pad is expected to be lower is set to be longer than the sampling period in a case where the wear volume or the temperature of the brake pad is expected to be higher, or the sampling period in a case where a likelihood of the braking of the vehicle being performed is lower is set to be longer than the sampling period in a case where a likelihood of the braking of the vehicle being performed is higher, wherein the driving environment information includes surrounding situation information indicating an inter-vehicular distance between the vehicle and a preceding vehicle, and the processor is further programmed to set the sampling period in a case where the inter-vehicular distance or a TTC (Time to Collision) is longer to be longer than the sampling period in a case where the inter-vehicular distance or the TTC is shorter.

11. The brake pad state estimation device according to claim 10, wherein the processor is further programmed to:

determine, based on the driving environment information, whether or not the vehicle is traveling on a downhill road; and set the sampling period in a case where the vehicle is traveling on the downhill road to be shorter than the sampling period in a case where the vehicle is not traveling on the downhill road.

12. The brake pad state estimation device according to claim 10, wherein the driving environment information includes map information, position information indicating a position of the vehicle, and traffic jam information indicating a position of a traffic jam, the processor is further programmed to:

determine, based on the map information, the position information, and the traffic jam information, whether or not the vehicle is within a predetermined area on a near side the traffic jam, and set the sampling period in a case where the vehicle is within the predetermined area to be shorter than the sampling period in a case where the vehicle is outside the predetermined area.

\* \* \* \* \*